United States Patent [19]

Baus

[11] Patent Number: 4,464,687
[45] Date of Patent: Aug. 7, 1984

[54] JITTER-FREE GEAR ARRANGEMENT FOR EQUIPMENT REQUIRING PRECISION MECHANICAL MOVEMENT

[75] Inventor: Rene Baus, Palos Verdes, Calif.

[73] Assignee: American Magnetics Corporation, Sherman Oaks, Calif.

[21] Appl. No.: 425,505

[22] Filed: Sep. 28, 1982

[51] Int. Cl.³ .................... G11B 25/04; F16H 57/12; G06K 13/103
[52] U.S. Cl. ........................................ 360/2; 74/411; 235/475
[58] Field of Search ...................... 464/70, 73; 74/665, 74/411; 73/430, 471; 235/475; 360/2; 271/109, 264

[56] References Cited

U.S. PATENT DOCUMENTS

| | | | |
|---|---|---|---|
| 2,474,347 | 6/1949 | Collins | 464/70 |
| 3,552,145 | 1/1977 | Barton et al. | 464/73 |
| 4,172,369 | 10/1979 | Hayes et al. | 464/73 |
| 4,274,269 | 6/1981 | Traubue | 464/70 |

Primary Examiner—Vincent P. Canney
Attorney, Agent, or Firm—Bromberg, Sunstein & McGregor

[57] ABSTRACT

Jitter, characteristic of gear trains used for precision movement of magnetic cards in gear driven card readers-writers, is eliminated by forming, in situ, a resilient material as a dampening arrangement in a recess in the gear to which a drive shaft is connected for driving that movement. Alternative dampening spring arrangements are disclosed.

16 Claims, 6 Drawing Figures

JITTER-FREE GEAR ARRANGEMENT FOR EQUIPMENT REQUIRING PRECISION MECHANICAL MOVEMENT

FIELD OF THE INVENTION

This invention relates to magnetic recording equipment and, more particularly, to such equipment in which magnetic heads are positioned to read or write magnetic indications on a medium such as a credit card.

BACKGROUND OF THE INVENTION

As is familiar with magnetic card readers, a card usually is placed into a slot and is then moved with respect to a delicate head assembly. Typically, such a reader contains a variety of elements which are required to cooperate in a way which is precisely prescribed in order to be able to read (or write) magnetic indications on the card. Drive belts may be employed to ensure the desired cooperation. But drive belts are costly. Alternatively, gear trains may be used. However, suitable gear trains require a high degree of precision. Moreover, the various forms of looseness (e.g. shaft endplay, gear backlash) and imperfection (e.g. shaft eccentricity, gear tooth irregularity) characteristic of gear tains often combine to introduce irregular extraneous motions which are transmitted by the rigid mechanical coupling to the driven member. This irregular motion, or jitter, causes errors in both reading and writing.

BRIEF DESCRIPTION OF THE INVENTION

The problem of jitter is resolved by employing resilient material in a recess in the face of a gear or wheel in a manner to damp out small irregular motions transmitted from the drive components. In one embodiment, a drive shaft coupled to the gear protrudes into a recess in the face of the gear and is knurled along that position of the shaft which protrudes into the recess. The floor of the recess is coated with a lubricant, and the recess filled with a curable resilient material which, when cured, adheres only to the drive shaft and to the wall of the recess. The cured material acts as a spring to damp out any oscillations in the gear which could otherwise lead to jitter. In another embodiment, springs are placed in the recess to avoid jitter in a similar manner. Other embodiments employ the foregoing dampening arrangements to couple the drive shaft to a wheel.

DETAILED DESCRIPTION

Figure 1:
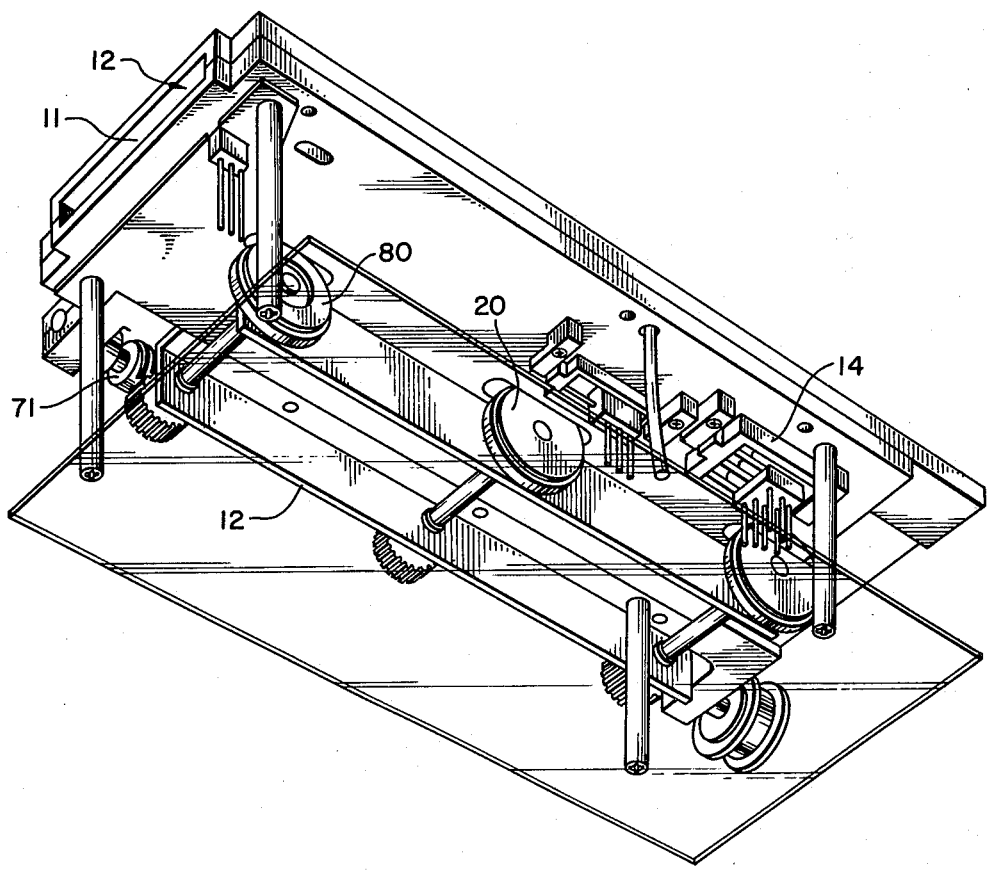
FIG. 1 is a perspective view of a portion of a card reader including a card holder assembly and gear train drive arrangement in accordance with this invention.

FIG. 1 shows a magnetic card reader-writer 10 which may be used for example as an automatic teller machine in banks. The machine includes a slot 11 through which a card is inserted into a tray or channel 12 for movement past read-write arrangement 14. The read-write arrangement is disclosed in copending application Ser. No. 214,166 filed Dec. 8, 1980 for Rene Baus and assigned to the assignee of the present application.

A motor (not shown) is adapted to drive a gear train operative to move wheels which engage the card sequentially and cause its movement along the channel. One of the wheels includes a plurality of magnetic markings along its periphery. That wheel is adapted to mark a magnetic card during a write operation and is called an "emitter" wheel in the above-mentioned copending application. The marks on a magnetic card are necessarily precisely defined spacially. Consequently, any uncontrolled movement of the wheel is to be avoided particularly during a write operation.

The emitter wheel is driven by the above-mentioned gear train so that the position of the magnetic card and the position of the emitter wheel are in registry with one another as the card is moved. This gear train has been found to produce an unwanted jitter which leads to incorrect markings on the card.

Figure 2:
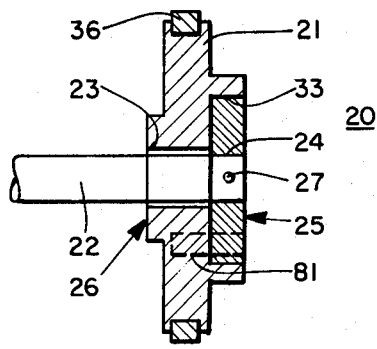
FIG. 2 and FIGS. 3, 4 and 5 are cross section and top views respectively of wheels or gears having recesses with jitter dampening arrangements in accordance with embodiments of this invention.

FIG. 2 shows a wheel assembly 20 including a wheel 2, and drive shaft 22. The wheel includes a central aperature 23 and a central recess 24 in its face 25. Drive shaft 22 is inserted into aperture 23 from face 26 of the wheel. The drive shaft extends into recess 24 and is secured by a pin 30 through pin hole 27. Pin 30 is shown in FIG. 3.

Figure 3:
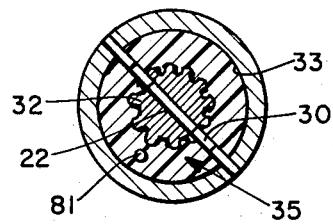

Also shown in FIG. 3 is the end view of drive shaft 22. As can be seen in the figure, the end of drive shaft 22 is knurled or fluted as indicated at 32. The knurled end of the drive shaft extends along a length of the shaft equal to the depth of the recess and circumferential wall 33 as shown in FIG. 2. The recess also has a floor 35 as shown in FIG. 3.

A curable material with the consistency of putty is added to fill the recess and is cured in situ. The material is chosen to stay resilient after curing and is added in a manner to adhere only to the knurled end position of shaft 22 and to circumferential wall 33. Floor 35 of recess 24 is coated with a lubricant to preclude the possibility of the material adhering to the floor of the recess. In this manner, a resilient member is formed, in situ, in the recess and, after curing, has a dampening effect on any oscillations in the gear train driving shaft 22.

In one specific embodiment, wheel assembly 20 was found to be free of jitter. In that embodiment, wheel 21 had the dimension of one inch in diameter and three sixteenths inch in thickness, weighing 1.33 grams. Recess 24 was one half inch in diameter and 0.122 inches deep. Drive shaft 22 was 2.5 inches long, three sixteenths inch in diameter and weighed 8.8 grams. Pin 30 had a length of 0.25 inch and hole 27 had a diameter of one sixteenth inch. The material which filled recess 24 was a common polyurethane with a shove of 60° A. The lubricant for floor 35 of recess 24 of FIG. 2 is a common instrument oil and is preferably mixed with an antisticking agent e.g. a powdered flouro-plastic such as that sold under the name Teflon available from Dupont Corporation. The polyurethane putty was cured at 165° F. for about 2 hours. With recess 24 filled with the above material as described, the gear train was found to be free of jitter and permitted magnetic markings to be closely spaced without error. In the absence of a dampening arrangement such as the in situ-formed, resilient material, significant errors in the placement of magnetic markings in excess of 50 microinches occured on occasion during write operations.

Figure 4:
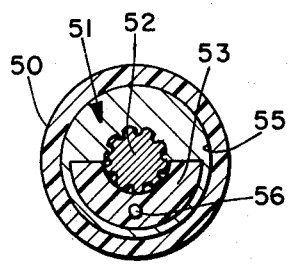

Alternative dampening arrangements have been used to avoid jitter in the gear train of an automatic teller machine in accordance with other embodiments of this invention. FIG. 4, for example, shows a wheel 50 with a recess 51. A drive shaft 52 protrudes into recess 51 as was the case in the embodiment of FIGS. 2 and 3. A half-annulus 53 of polyurethane neoprene was set into the recess in a snug fit relationship with drive shaft 52 and with peripheral wall 55 of recess 51. The half annulus was retained in place by pin 56.

Figure 5:
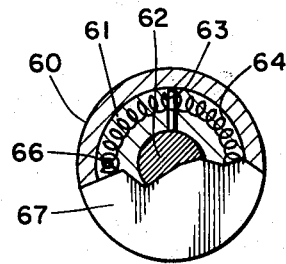

FIG. 5 also shows a similar arrangement where a coil spring provides the dampening effect to remove jitter. In this embodiment, wheel 60 has a recess 61 into which drive shaft 62 protrudes. A pin 63 extends across recess 61 through the end of drive shaft 62. Coil spring 64 is coupled to pin 63 by inserting the ends of pin 63 between adjacent coils of the spring. The spring is retained in place with respect to wheel 60 by pin 66 which protrudes into recess 61 as does drive shaft 62. Spring 64 also is retained in place by cap 67.

Figure 6:
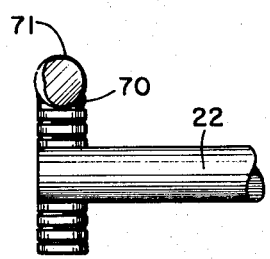
FIG. 6 is a projection view of a portion of a gear train arrangement used in the reader of FIG. 1.

The magnetic card in channel 12 moves by virtue of a set of wheels like 21 which bear against its surface. Each wheel includes a solid rubber rim (tire) 36 shown in FIG. 2. Each wheel is on a drive shaft like 22 with a gear 70 attached to the remote end as shown in FIG. 6. A worm gear 71 engages the gear at the end of the drive shaft, driving all the drive shafts synchronously when activated.

FIG. 1 shows three drive shafts each with a gear 70 and wheel 20 all driven by worm gear 71. In the arrangement shown, wheel 80 includes a recess like 24 of FIG. 2 but that recess is not filled with the above-mentioned dampening arrangement. Instead, wheel 80 includes a pin 81 shown dotted in FIGS. 2 and 3. The wheel is adapted to slip 180° to allow a card to be removed from gate 11 after magnetic code is written on it. If the card is not removed, the continued rotation of the wheel causes the card to be taken back into the channel for eventual removal at the remote end of the channel. The wheel is driven at a rate of 10 inches (or three revolutions) per second for removal of the card.

In practice a card is advanced in channel 12 between sets of opposing wheels. Only three wheels are visible in FIG. 1 because of the orientation of the apparatus in the figure. Three other wheels are placed to oppose the wheel shown. These other wheels are similarly constructed and are driven by individual drive shafts arranged to engage worm gear 71.

It is to be understood that although the present invention has been described with reference to a gear or wheel in a magnetic card reader, the dampening apparatus of the present invention is applicable to any mechanical structure employing gears or wheels. Furthermore while an ultimate driving or driven member of the mechanism has been selected for installation of the dampening apparatus in the magnetic card reader shown, it will be appreciated by one skilled in the art that the present invention may be used to advantage on intermediate drive members or elsewhere as mechanical factors may require.

Accordingly while the invention has been described with reference to specific embodiments thereof, it will be understood that it may be embodied in a variety of forms diverse from those shown without departing from the spirit and scope of the invention as defined by the following claims.

What is claimed is:

1. A drive assembly including a wheel having an aperture extending between first and second opposing faces, said wheel also including a recess open at said first face, said recess having a floor and a peripheral wall, a drive shaft extending through said aperture into said recess, and a dampening arrangement disposed in said recess and coupled to said peripheral wall and to said drive shaft in a manner to dampen jitter between said drive shaft and said wheel.

2. A drive assembly in accordance with claim 1 wherein said dampening arrangement comprises a resilient material coupled to said peripheral wall and to a first end position of said drive shaft extending into said recess.

3. A drive assembly in accordance with claim 2 wherein said resilient material is formed in situ from a putty which is curable to a solid resilient material.

4. A drive assembly in accordance with claim 2 wherein said resilient material is preformed and set into said recess in a manner to fit snugly against said first end position and against said peripheral wall.

5. A drive assembly in accordance with claim 3 wherein said first end position of said drive shaft is knurled for improving coupling to said resilient material.

6. A drive assembly in accordance with claim 1 wherein said dampening arrangement includes a spring disposed in said recess and coupling said drive shaft to said wheel.

7. An arrangement comprising a plurality of drive assemblies in accordance with claim 1, each of said drive assemblies including a drive shaft having a second end portion, a gear connected to each of said second end positions, and gear means adapted to engage said gears for synchronous movement of said drive shafts.

8. An arrangement in accordance with claim 7 wherein the wheels of the drive assemblies are disposed to move an information-bearing magnetic medium past a magnetic head assembly.

9. A drive assembly in accordance with claim 1 wherein the wheel is a gear toothed around its circumference.

10. An arrangement comprising a plurality of drive assemblies in accordance with claim 9, each of said drive assemblies including a drive shaft having a second end position, a wheel connected to each of said second end positions, and gear means adapted to engage the gears of the drive assemblies for synchronous movement of said drive shafts.

11. A drive train for moving an information bearing magnetic card having a length, along a channel past a magnetic head assembly without jitter, such drive train including:
   a wheel having an aperture extending between first and second opposing faces, said wheel also including a recess open at said first face, said recess having a floor and a peripheral wall;
   a drive shaft having a first end portion extending into the recess; and
   a dampening means, disposed in the recess and coupled to the peripheral wall and to the drive shaft, for dampening jitter between the drive shaft and the wheel, and transmitting drive forces to the card while eliminating the jitter of the drive train.

12. A drive assembly for moving an information bearing magnetic card past a magnetic head assembly, comprising a plurality of spaced-apart adjacent drive trains according to claim 11, wherein the wheel of each drive train is spaced apart from the wheel of the adjacent drive train a distance less than the card length and is disposed to tangentially engage the card for moving it along a common channel;

each of said drive shafts having a second end portion with a gear connected thereto;

said drive assembly further having first means for engaging the gears and synchronously driving said drive shafts, so that the card is sequentially engaged by successive drive wheels and moved along the channel without jitter.

13. A drive assembly for moving an information-bearing magnetic card past a magnetic head according to claim 12, wherein the dampening means of each said wheel includes a resilient material coupled to the peripheral wall of the wheel and to the first end portion of the corresponding drive shaft.

14. A drive assembly in accordance with claim 13, wherein the resilient material of at least one such wheel is formed in situ from a putty which is curable to a solid resilient material.

15. A drive assembly in accordance with claim 13, wherein the resilient material of at least one wheel is pre-formed and set into the recess in a manner to fit snugly against the first end portion of the shaft and against the peripheral wall.

16. A drive assembly in accordance with claim 14, wherein the first end portion of the drive shaft is knurled for improving coupling to the resilient material.

* * * * *